(12) United States Patent
Tian

(10) Patent No.: US 11,824,404 B2
(45) Date of Patent: Nov. 21, 2023

(54) MOTOR WITH OUTER ROTOR HAVING EXHAUST PLATES

(71) Applicant: Shandong Dingfeng Aviation Technology Co., Ltd., Jining (CN)

(72) Inventor: Yu Tian, Hong Kong (CN)

(73) Assignee: SHANDONG DINGFENG AVIATION TECHNOLOGY CO., LTD., Jining (CN)

( * ) Notice: Subject to any disclaimer, the term of this patent is extended or adjusted under 35 U.S.C. 154(b) by 60 days.

(21) Appl. No.: 17/220,943

(22) Filed: Apr. 2, 2021

(65) Prior Publication Data
US 2021/0313852 A1 Oct. 7, 2021

(30) Foreign Application Priority Data

Apr. 2, 2020 (CN) .......................... 202020467898.4

(51) Int. Cl.
| | |
|---|---|
| *H02K 1/2791* | (2022.01) |
| *H02K 1/32* | (2006.01) |
| *H02K 9/06* | (2006.01) |
| *H02K 9/22* | (2006.01) |
| *H02K 11/33* | (2016.01) |

(52) U.S. Cl.
CPC ............. *H02K 1/2791* (2022.01); *H02K 1/32* (2013.01); *H02K 9/06* (2013.01); *H02K 9/227* (2021.01); *H02K 11/33* (2016.01)

(58) Field of Classification Search
CPC ....... H02K 1/2786–2789; H02K 1/279; H02K 1/2791; H02K 1/27915; H02K 1/2792; H02K 1/32; H02K 9/04; H02K 9/06; H02K 11/30; H02K 11/33; H02K 21/22; H02K 9/227
See application file for complete search history.

(56) References Cited

U.S. PATENT DOCUMENTS

| | | | |
|---|---|---|---|
| 2004/0163423 A1* | 8/2004 | Kim ......................... | H02K 1/32 68/24 |
| 2011/0148230 A1* | 6/2011 | Knorr .................. | H02K 1/2786 310/62 |

FOREIGN PATENT DOCUMENTS

| | | | | |
|---|---|---|---|---|
| DE | 202016102350 U1 * | 7/2016 | | |
| EP | 1419568 B1 * | 5/2005 | ............... | F01P 5/04 |
| WO | WO-2016106711 A1 * | 7/2016 | ............... | H02K 5/20 |

OTHER PUBLICATIONS

Machine Translation of DE202016102350, Jul. 2016 (Year: 2016).*

* cited by examiner

*Primary Examiner* — Eric Johnson
(74) *Attorney, Agent, or Firm* — WPAT LAW, P.C.; Anthony King

(57) ABSTRACT

A motor with an outer rotor, including an inner stator, an outer rotor with a cylindrical structure having an open end, a controller, and a cooling fan. The outer rotor is rotatably sleeved at one end of the inner stator in an axial direction of the inner stator; the controller is arranged at the other end of the inner stator; the cooling fan is annularly arranged in a circumferential direction of the outer rotor at one end of the outer rotor close to the controller, and is located in an avoidance space formed between the controller and the outer rotor, so as to convey air to the controller and the outer rotor.

14 Claims, 4 Drawing Sheets

MOTOR WITH OUTER ROTOR HAVING EXHAUST PLATES

TECHNICAL FIELD

This disclosure relates to the technical field of motors, and in particular, to a motor with an outer rotor.

BACKGROUND

With the continuous development of integrated motors, an integrated design of motors and governors has become one of the trends in the development and improvement of motors. As one of the motors, a motor with an outer rotor is also developing towards integration.

The motor with an outer rotor integrated with the governor is favored by the market because of its high integration, small size, light weight, etc. However, the motor with an outer rotor integrated with the governor also has many problems, which are mainly reflected in: 1. The motor with an outer rotor integrated with the governor often has poor heat dissipation capability and is prone to excessive temperature, which will affect its own working performance and service life. 2. Although some existing motors with an outer rotor design cooling blades on a rotor housing to implement air cooling, the existing cooling structure is simple in design and poor in cooling effect, and cannot meet the requirements for heat dissipation of the governor and a main body of the motor with an outer rotor. 3. The cooling blades on the existing rotor housing mainly dissipate heat of an outer rotor main body, but cannot function to dissipate heat of the governor. 4. The existing cooling blades have the problems of inconvenience in replacement, adjustment and maintenance.

Therefore, there is an urgent need to provide a motor with an outer rotor, which can solve the above problems.

SUMMARY

An object of this disclosure is to provide a motor with an outer rotor, which has the advantage of high heat dissipation capability.

To achieve the above object, the disclosure adopts the following technical solution:

A motor with an outer rotor, including:
an inner stator;
an outer rotor in a shape of a cylinder having an open end, where the outer rotor is rotatably sleeved at one end of the inner stator in an axial direction of the inner stator;
a controller arranged at the other end of the inner stator; and
a cooling fan annularly arranged in a circumferential direction of the outer rotor at one end of the outer rotor close to the controller and located in an avoidance space formed between the controller and the outer rotor, so as to convey air to the controller and the outer rotor;
where a peripheral wall of one end of the outer rotor that is not provided with the cooling fan is provided with a plurality of air outlets, an inner wall of the outer rotor facing the opening is provided with an exhaust plate, and the exhaust plate is configured to push air in the outer rotor to each of the air outlets.

Optionally, the air outlets are arranged in a peripheral wall of the outer rotor at intervals in the circumferential direction of the outer rotor to form an exhaust hole group.

Optionally, there are a plurality of exhaust hole groups, and the exhaust hole groups are arranged in the peripheral wall of the outer rotor at intervals in an axial direction of the outer rotor.

Optionally, the air outlets each have a structure in a strip hole shape, the length of the air outlet extends in the circumferential direction of the outer rotor, and the width of the air outlet extends in the axial direction of the outer rotor.

Optionally, the air outlet has a width of 1-1.6 mm.

Optionally, the inner wall of the outer rotor facing the opening is provided with a shaft hole for rotatable insertion of the inner stator, there are a plurality of exhaust plates, the exhaust plates are distributed around the circumference of the shaft hole, and a main body of each of the exhaust plates extends in a radial direction of the shaft hole.

Optionally, the cooling fan includes:
at least two cooling components, where the cooling components are detachably and annularly arranged at one end of the outer rotor close to the controller.

Optionally, the cooling component includes:
a connecting portion bolted to one end of the outer rotor close to the controller; and
a plurality of cooling fins, where the cooling fins are arranged on the connecting portion at intervals, and are integrally formed with the connecting portion.

Optionally, an outer side wall of the controller is provided with cooling ribs.

Optionally, there are a plurality of cooling ribs, and the cooling ribs are annularly arranged on an outer peripheral wall of the controller.

The disclosure has the following beneficial effects:
When the motor with an outer rotor actually works, a cooling fan of the motor with an outer rotor rotates with the outer rotor, and then air is conveyed to a controller and the outer rotor through the cooling fan to blow and cool the controller and the outer rotor; in addition, the outer rotor is internally provided with an exhaust plate; when the outer rotor rotates, the exhaust plate also rotates, and then the exhaust plate accelerates the discharge of the air in the outer rotor to the outside of the outer rotor through air outlets. The exhaust function of the exhaust plate matches the blowing effect of the cooling fan on the outer rotor, which accelerates the dissipation of heat of the outer rotor and the inner stator; in addition, because the cooling fan can blow the air to the controller and the outer rotor respectively, when the motor with an outer rotor according to the disclosure rotates, each part of the motor with an outer rotor can achieve a good heat dissipation effect, and the motor with an outer rotor has the advantage of high heat dissipation capability.

Figure 1:
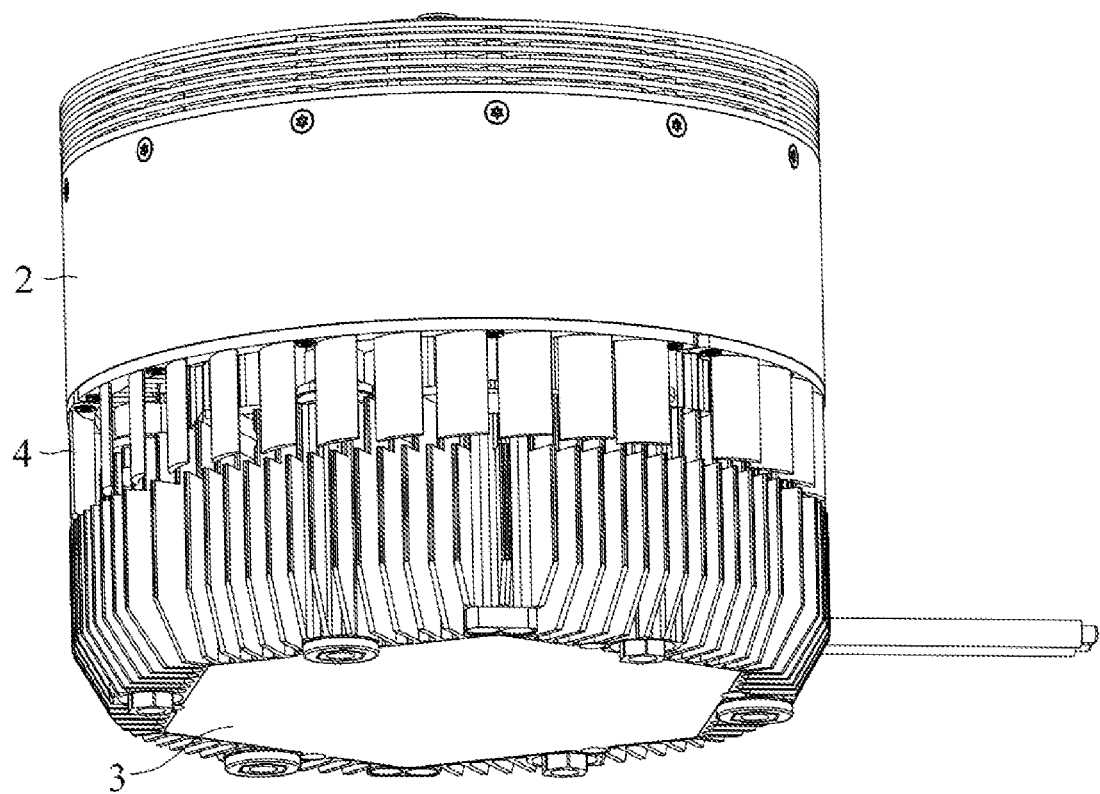
FIG. 1 is a perspective diagram of a motor with an outer rotor according to the disclosure.

In the drawings:
1: inner stator; 2: outer rotor; 21: air outlet; 22: exhaust plate; 3: controller; 31: cooling rib; 4: cooling fan; 41: cooling component; 411: connecting portion; 412: cooling fin.

DESCRIPTION OF THE EMBODIMENTS

In order to make the technical problem solved by the disclosure, the technical solution adopted and the technical effect achieved clearer, the technical solution of the disclosure will be further explained below with reference to the drawings and specific implementations.

In the description of the disclosure, unless otherwise clearly specified and defined, the terms "connected", "coupled", and "fixed" should be understood in a broad sense. For example, it can be a fixed connection, a detachable connection, or integration. It can be a mechanical connection or an electrical connection. It can be a direct connection, or an indirect connection through an intermediate medium. It can also be an intercommunication between two elements or the interaction between two elements. Those of ordinary skill in the art can understand the specific meanings of the above terms in the disclosure according to specific situations.

In the disclosure, unless otherwise clearly defined and defined, the first feature being "above" or "under" the second feature may include that the first and second features are in direct contact, or may include that the first and second features are not in direct contact but in contact through other features between them. Moreover, the first feature being "on", "at the upper side of" and "on the upper surface of" the second feature includes that the first feature is right above and at the oblique upper side of the second feature, or only indicates that the horizontal height of the first feature is greater than that of the second feature. the first feature being "below", "at the lower side of" and "on the lower surface of" the second feature includes that the first feature is right below and at the oblique lower side of the second feature, or only indicates that the horizontal height of the first feature is less than that of the second feature.

In the description of the disclosure, orientations or positional relationships indicated by the terms "upper", "lower", "left", "right" and the like are orientations or positional relationships as shown in the drawings, and are only for the purpose of facilitating the description and simplifying the operation, instead of indicating or implying that devices or elements indicated must have particular orientations, and be constructed and operated in the particular orientations, so that these terms are not construed as limiting the disclosure. In addition, the terms "first" and "second" are only used to distinguish the description and do not have special meanings.

Figure 2:
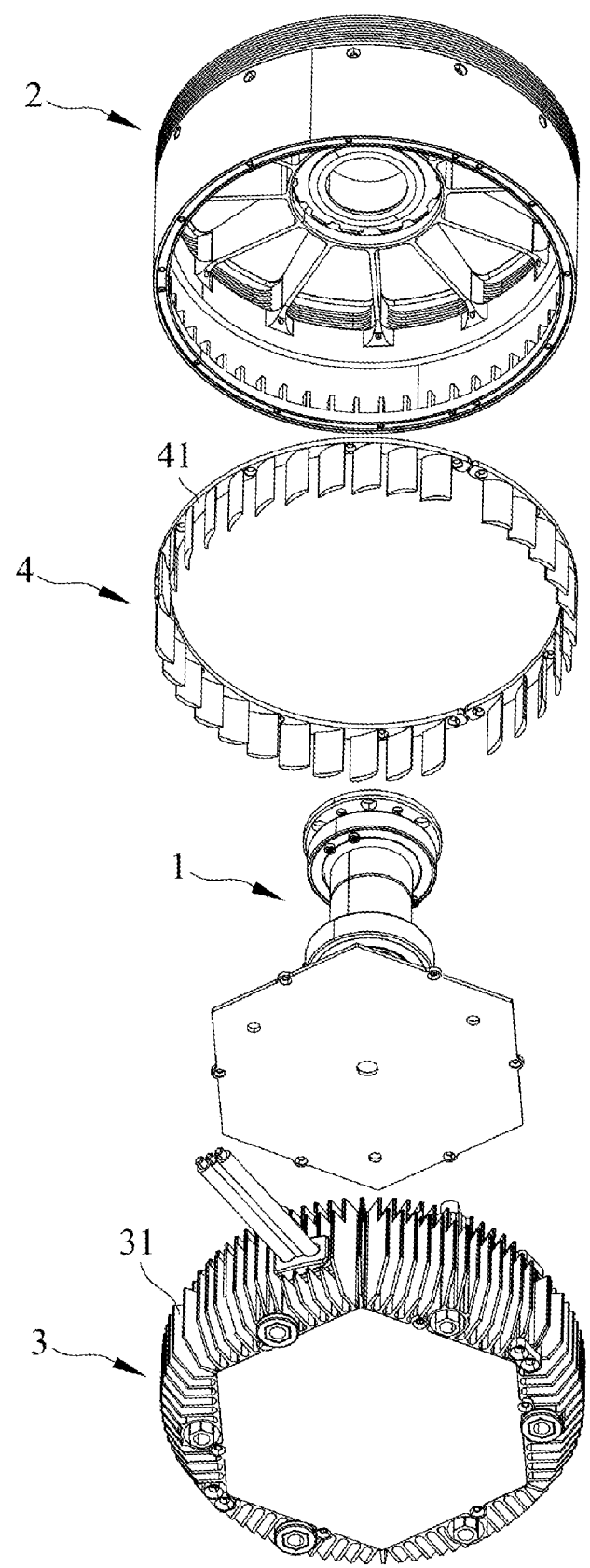
FIG. 2 is a disassembly diagram of the motor with an outer rotor according to the disclosure.
Figure 3:
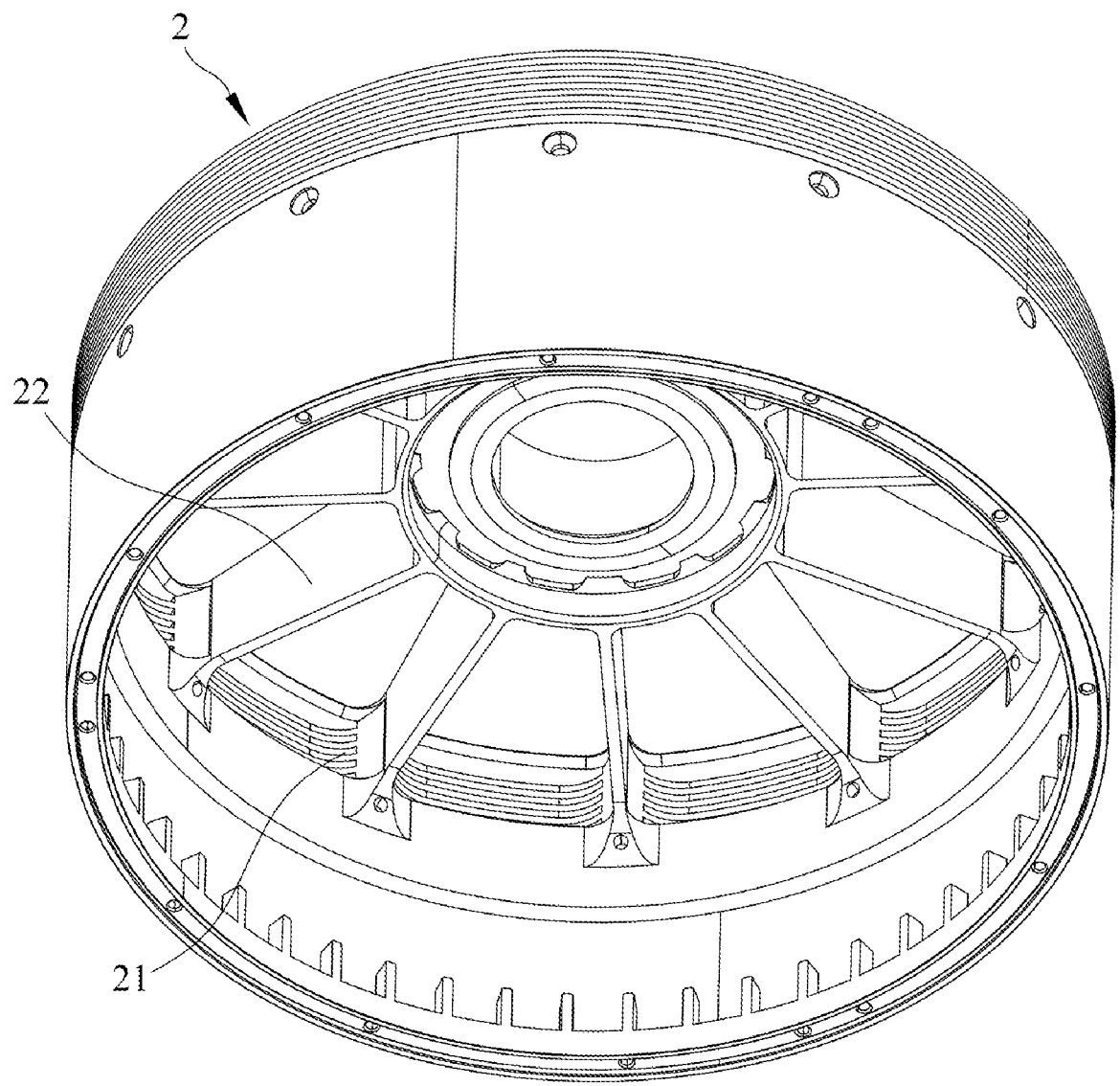
FIG. 3 is a structural view of an outer motor according to the disclosure.

As shown in FIGS. 1-3, this embodiment provides a motor with an outer rotor, which has the advantages of small size, compact structure and strong heat dissipation capability. The motor with an outer rotor mainly includes an inner stator 1, an outer rotor 2, a controller 3, and a cooling fan 4. The inner stator 1 only shows a central axis of the inner stator 1, and other structures of the inner stator 1 are not shown. The outer rotor 2 has a cylindrical structure having an open end, where the outer rotor 2 is rotatably sleeved at one end of the inner stator 1 in an axial direction of the inner stator 1. The controller 3 is arranged at the other end of the inner stator 1, and the motor with an outer rotor forms an integrated structure with the controller 3 integrated, which has the advantages of small size and compact structure. The cooling fan 4 is annularly arranged in a circumferential direction of the outer rotor 2 at one end of the outer rotor 2 close to the controller 3, and the cooling fan 4 is located in an avoidance space formed between the controller 3 and the outer rotor 2, so as to convey air to the controller 3 and the outer rotor 2; a peripheral wall of one end of the outer rotor 2 that is not provided with the cooling fan 4 is provided with a plurality of air outlets 21, an inner wall of the outer rotor 2 facing the opening is provided with an exhaust plate 22, and the exhaust plate 22 is configured to push air in the outer rotor 2 to each of the air outlets 21.

When the motor with an outer rotor rotates and works, the cooling fan 4 rotates with the outer rotor 2, and then air is blown to the controller 3 and the outer rotor 2 through the cooling fan 4 to blow and cool the controller 3 and the outer rotor 2; in addition, the outer rotor 2 is internally provided with an exhaust plate 22; when the outer rotor 2 rotates, the exhaust plate 22 also rotates, and then the exhaust plate 22 further accelerates the discharge of the air in the outer rotor 2 through the air outlets 21, which matches the blowing effect of the cooling fan 4 on the outer rotor 2, thereby accelerating the dissipation of heat of the outer rotor 2 and the inner stator 1 and improving the heat dissipation capability. Therefore, the motor with an outer rotor can better dissipate heat of each part of the motor with an outer rotor, and has the advantage of high heat dissipation capability.

The cooling fan 4 of this embodiment can blow air to the controller 3 located on one side of the cooling fan 4, and blow air to the outer rotor 2 located on the other side of the cooling fan 4, so as to perform air cooling and heat dissipation on each component of the motor with an outer rotor. In order to further improve the heat dissipation effect of the controller 3, as shown in FIG. 2, an outer side wall of the controller 3 is provided with cooling ribs 31. Specifically, the cooling ribs 31 are integrally formed on the outer side wall of a housing of the controller 3, thereby increasing the heat exchange area of the housing of the controller 3 and improving the heat dissipation effect. Moreover, in this embodiment, there are a plurality of cooling ribs 31, and the cooling ribs 31 are annularly arranged on the outer peripheral wall of the controller 3, so that fast heat dissipation can be implemented around the controller 3.

Further, in order to enable the air in the outer rotor 2 to be uniformly discharged from the outer rotor 2 in the process of fast rotation of the outer rotor 2, As shown in FIGS. 2-3, the air outlets 21 are arranged in a peripheral wall of the outer rotor 2 at intervals in the circumferential direction of the outer rotor 2 to form an exhaust hole group. Since the air outlets 21 are arranged at intervals in the circumferential direction of the outer rotor 2, the air in the outer rotor 2 can be discharged from around the outer rotor 2 at 360 degrees, thereby ensuring that the air in the outer rotor 2 can be uniformly discharged from around the outer rotor 2. Specifically, the air outlets 21 each have a structure in a strip hole shape, the length of the air outlet 21 extends in the circumferential direction of the outer rotor 2, and the width of the air outlet 21 extends in the axial direction of the outer rotor 2. In this embodiment, the air outlet 21 has a width of 1.5 mm. In other embodiments, the width of the air outlet 21 may be set to a value within 1-1.6 mm. The moderate width of the air outlet 21 can ensure a good ventilation effect, and play a certain dustproof and waterproof effect.

Further, in order to make the outer rotor 2 have better exhaust capability, there are a plurality of exhaust hole groups, and the exhaust hole groups are arranged in the peripheral wall of the outer rotor 2 at intervals in an axial direction of the outer rotor 2. Specifically, in this embodiment, there are four exhaust hole groups. The four exhaust hole groups ensure that the outer rotor 2 has better exhaust capability, and also has a certain dustproof and waterproof effect because the width of each air outlet 21 is 1.5 mm.

In addition, as shown in FIGS. 2-3, in this embodiment, the inner wall of the outer rotor 2 facing the opening is provided with a shaft hole (not shown in the figure) for rotatable insertion of the inner stator 1, there are a total of twelve exhaust plates 22, the exhaust plates 22 are distributed around the circumference of the shaft hole, and a main body of each of the exhaust plates 22 extends in a radial direction of the shaft hole. Each exhaust plate 22 forms a wind wheel structure on the inner wall of the outer rotor 2 facing the opening. When the outer rotor 2 rotates rapidly, each exhaust plate 22 can quickly push the air in the outer rotor 2 in the radial direction of the outer rotor 2 to the peripheral wall of the outer rotor 2 provided with the air outlets 21, so that the air in the outer rotor 2 is quickly discharged through the air outlets 21; moreover, the movement of the air in the outer rotor 2 driven by the exhaust plate 22 can generate a rotating centrifugal flow in the outer rotor 2, and finally the air is thrown to the outside of the outer rotor 2, thereby further promoting the discharge of air and improving the heat dissipation effect of the outer rotor 2 and the inner stator 1. In other embodiments, there may be four, five or eight exhaust plates 22. In addition, since this embodiment mainly improves the heat dissipation structure of the outer rotor 2 and does not involve the structural improvement of a permanent magnet core (not shown in the figure) of the outer rotor 2, the permanent magnet core of the outer rotor 2 adopts the existing structure, and thus details are no longer repeated.

Figure 4:
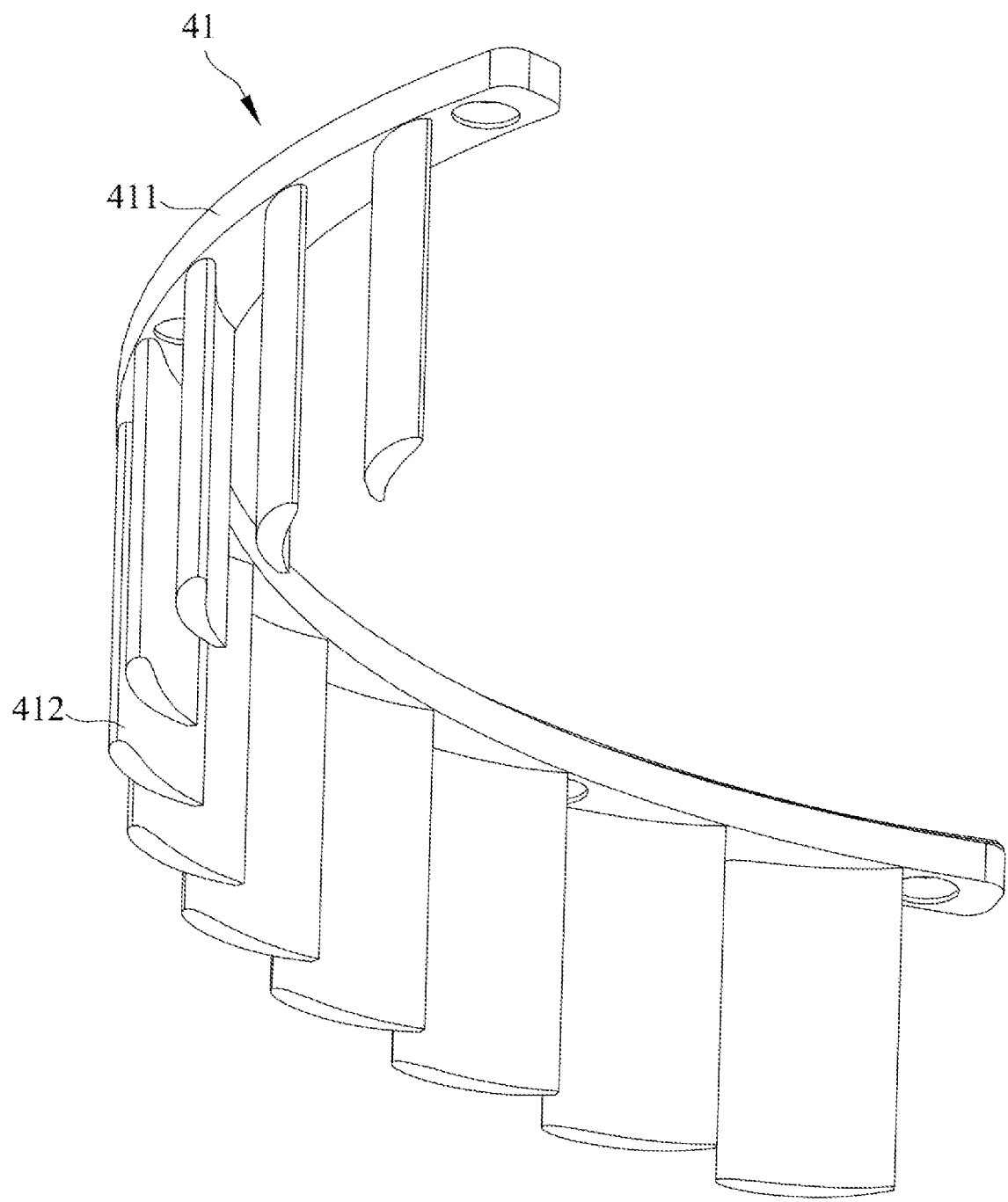
FIG. 4 is a perspective diagram of a cooling component according to the disclosure.

In addition, in order to facilitate the installation, removal, replacement and maintenance of the cooling fan 4, in this embodiment, a split design is adopted for the cooling fan 4. As shown in FIGS. 2 and 4, in this embodiment, the cooling fan 4 includes three cooling components 41. The cooling components 41 are detachably and annularly arranged at one end of the outer rotor 2 close to the controller 3. With such a design, when one or more cooling components 41 are damaged, they can be directly removed for replacement, without replacing the entire cooling fan 4. Moreover, compared to the design structure in which the outer rotor 2 and the cooling fan 4 are integrally formed, such a design facilitates maintenance and replacement and reduces costs. In other embodiments, there may be two, four, five or more cooling fans 4.

Moreover, for some existing cooling fans 4, the controller 3 needs to be dismantled therefrom first during disassembly, so that the cooling fan 4 can be disassembled or assembled. The cooling fan 4 of this embodiment adopts a split design. When the cooling component 41 is actually disassembled or assembled, the controller 3 does not need to be removed, and the cooling component 41 in the avoidance space formed between the controller 3 and the outer rotor 2 can be directly dismantled and then replaced with another cooling component 41, which simplifies the assembly and disassembly steps and reduces the difficulty of maintenance.

In addition, for the cooling component 41, specifically, as shown in FIG. 2 and FIG. 4, in this embodiment, the cooling component 41 includes a connecting portion 411 and a plurality of cooling fins 412. The connecting portion 411 has an arc shape. The connecting portion 411 is bolted to one end of the outer rotor 2 close to the controller 3; the cooling fins 412 are arranged on the connecting portion 411 at intervals; and each cooling fin 412 and the connecting portion 411 are integrally machined and formed, thereby reducing the number of parts and the difficulty of assembly while ensuring that the cooling fan 4 has a split design.

The above content is only preferred embodiments of the disclosure. For those of ordinary skill in the art, changes may be made in the specific implementation and the scope of application according to the idea of the disclosure. The content of the specification should not be understood as restrictions on the disclosure.

What is claimed is:

1. A motor with an outer rotor, comprising:
an inner stator (1) having a first end and a second end;
an outer rotor (2) with a cylindrical structure having an open end forming a ledge and an opening, wherein the outer rotor (2) is rotatably sleeved at the first end of the inner stator (1) in an axial direction of the inner stator (1);
a controller (3) arranged at the second end of the inner stator (1);
a cooling fan (4) having a plurality of cooling fins (412) annularly arranged in a circumferential direction of the outer rotor (2) at the open end of the outer rotor (2) close to the controller (3) and located in an avoidance space formed between the controller (3) and the outer rotor (2), so as to convey air to the controller (3) and the outer rotor (2);
wherein the cooling fan (4) has a connecting portion (411) having an arcuate side and a flat side, the arcuate side has a curvature that corresponds with a curvature of the cylindrical structure of the outer rotor (2), and the flat side has a width that corresponds with a thickness of the cylindrical structure of the outer rotor (2);
wherein the plurality of cooling fins (412) is disposed on the flat side and is entirely confined within the width of the flat side;
wherein a peripheral wall of one end of the outer rotor (2) that is not provided with the cooling fan (4) is provided with a plurality of air outlets (21), an inner wall of the outer rotor (2) facing the opening is provided with a plurality of exhaust plates (22), and the exhaust plates (22) are configured to push air in the outer rotor (2) to each of the air outlets (21).

2. The motor with an outer rotor according to claim 1, wherein the air outlets (21) are arranged in the peripheral wall of the outer rotor (2) at intervals in the circumferential direction of the outer rotor (2) to form an exhaust hole group.

3. The motor with an outer rotor according to claim 2, wherein there are a plurality of exhaust hole groups, and the exhaust hole groups are arranged in the peripheral wall of the outer rotor (2) at intervals in an axial direction of the outer rotor (2).

4. The motor with an outer rotor according to claim 3, wherein the inner wall of the outer rotor (2) facing the opening is provided with a shaft hole for rotatable insertion of the inner stator (1), there are a plurality of exhaust plates (22), the exhaust plates (22) are distributed around the circumference of the shaft hole, and a main body of each of the exhaust plates (22) extends in a radial direction of the shaft hole.

5. The motor with an outer rotor according to claim 3, wherein an outer side wall of the controller (3) is provided with cooling ribs (31).

6. The motor with an outer rotor according to claim 2, wherein the air outlets (21) each have a structure in a strip hole shape, the length of the air outlet (21) extends in the circumferential direction of the outer rotor (2), and the width of the air outlet (21) extends in the axial direction of the outer rotor (2).

7. The motor with an outer rotor according to claim 6, wherein the air outlet (21) has a width of 1-1.6 mm.

8. The motor with an outer rotor according to claim 7, wherein the inner wall of the outer rotor (2) facing the opening is provided with a shaft hole for rotatable insertion of the inner stator (1), there are a plurality of exhaust plates (22), the exhaust plates (22) are distributed around the circumference of the shaft hole, and a main body of each of the exhaust plates (22) extends in a radial direction of the shaft hole.

9. The motor with an outer rotor according to claim 6, wherein the inner wall of the outer rotor (2) facing the opening is provided with a shaft hole for rotatable insertion of the inner stator (1), there are a plurality of exhaust plates (22), the exhaust plates (22) are distributed around the circumference of the shaft hole, and a main body of each of the exhaust plates (22) extends in a radial direction of the shaft hole.

10. The motor with an outer rotor according to claim 2, wherein the inner wall of the outer rotor (2) facing the opening is provided with a shaft hole for rotatable insertion of the inner stator (1), there are a plurality of exhaust plates (22), the exhaust plates (22) are distributed around the circumference of the shaft hole, and a main body of each of the exhaust plates (22) extends in a radial direction of the shaft hole.

11. The motor with an outer rotor according to claim 2, wherein an outer side wall of the controller (3) is provided with cooling ribs (31).

12. The motor with an outer rotor according to claim 1, wherein the inner wall of the outer rotor (2) facing the opening is provided with a shaft hole for rotatable insertion of the inner stator (1), there are a plurality of exhaust plates (22), the exhaust plates (22) are distributed around the circumference of the shaft hole, and a main body of each of the exhaust plates (22) extends in a radial direction of the shaft hole.

13. The motor with an outer rotor according to claim 1, wherein an outer side wall of the controller (3) is provided with cooling ribs (31).

14. The motor with an outer rotor according to claim 13, wherein there are a plurality of cooling ribs (31), and the cooling ribs (31) are annularly arranged on an outer peripheral wall of the controller (3).

* * * * *